US008111972B2

United States Patent
Taguchi et al.

(10) Patent No.: US 8,111,972 B2
(45) Date of Patent: Feb. 7, 2012

(54) RECORDING DEVICE, COMPUTER READABLE MEDIUM AND RECORDING METHOD

(75) Inventors: Hiroyuki Taguchi, Kawasaki (JP); Youji Kimura, Kawasaki (JP); Takashi Kogure, Kawasaki (JP); Shoichi Haijima, Kawasaki (JP); Yasuhiko Isobe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 670 days.

(21) Appl. No.: 12/328,859

(22) Filed: Dec. 5, 2008

(65) Prior Publication Data
US 2009/0180752 A1 Jul. 16, 2009

(30) Foreign Application Priority Data
Jan. 10, 2008 (JP) .................................. 2008-003681

(51) Int. Cl.
*H04N 5/76* (2006.01)
(52) U.S. Cl. ........................................ 386/291; 386/293
(58) Field of Classification Search .................. 386/291, 386/293–296
See application file for complete search history.

(56) References Cited

U.S. PATENT DOCUMENTS

| | | | |
|---|---|---|---|
| 2005/0105536 A1* | 5/2005 | Fukunaga et al. | 370/395.53 |
| 2005/0113173 A1* | 5/2005 | Waters | 463/43 |
| 2005/0251830 A1* | 11/2005 | Peeten et al. | 725/58 |
| 2006/0165375 A1* | 7/2006 | Choi et al. | 386/83 |
| 2007/0182867 A1* | 8/2007 | Price et al. | 348/731 |
| 2008/0108438 A1* | 5/2008 | Sugiyama et al. | 463/42 |

FOREIGN PATENT DOCUMENTS

| | | |
|---|---|---|
| JP | 2006-74459 | 3/2006 |
| JP | 2007-201573 | 8/2007 |

* cited by examiner

*Primary Examiner* — Thai Tran
*Assistant Examiner* — Nigar Chowdhury
(74) *Attorney, Agent, or Firm* — Staas & Halsey LLP (57) ABSTRACT

A hard disk of a recording device is registered with in-advance setting data specifying a sports genre, a detection team/player and a detection period. A sports information service server accessible via a network N from the recording device includes a winning/losing outcome database recorded with information specifying a genre to which a game belongs and an outcome of wining or losing in each game with respect to the respective games held domestically and overseas. A CPU of the recording device, when reaching the detection time defined in the in-advance setting data, specifies the defined genre and the detection team/player, then receives the winning/losing data from the sports information service server, and determines whether the detection team/player defined in the in-advance setting data lost in the game or not. Then, when determining that the detection team/player lost in the game, a scheme is to prevent the already recorded data of the broadcast program of the game from remaining on the hard disk.

3 Claims, 4 Drawing Sheets

FIG. 3

PRESET DATA

| MANAGEMENT NO. | CHARACTER STRING AS UNIQUE ID |
|---|---|
| DETECTED SPORTS GENRE | BASEBALL/SOCCER/SUMO WRESTLING/ETC. |
| DETECTED TEAM/PLAYER | NAME OF TARGET TEAM OR PLAYER OF WHICH DEFEAT IS TO BE DETECTED IS SET. |
| DETECTION TARGET PROGRAM | TARGET PROGRAM IS SPECIFIED BY DESIGNATING BROADCASTING TIME AND CHANNEL OR BY SELECTING FROM A PROGRAM GUIDE. |
| DETECTION PERIOD | PERIOD FOR DETECTING RESULT INFORMATION IS SET. |
| DELETE POLICY | 1: COMPLETE DELETE (BY WHICH RECORDING DATA IS COMPLETELY DELETED)<br>2: SAVING RECORDING (RECORDING BY SAVING DISK CAPACITY WHILE DECREASING IMAGE QUALITY) |

FIG. 4

RESULT DATA BASE

| MANAGEMENT NO. | CHARACTER STRING AS UNIQUE ID |
|---|---|
| SPORTS GENRE | BASEBALL/SOCCER/SUMO/ETC. WRESTLING |
| COMPETITION NAME | COMPETITION NAME SUCH AS [CHUNICHI CROWNS]. IT IS BLANKED IN CASE OF THE PROFESSIONAL REGULAR BASEBALL GAME. |
| WINNER NAME | WINNING PLAYER'S NAME / TEAM'S NAME / CHAMPION'S NAME (IN CASE PLAYERS ARE RANKED IN ONE GAME SUCH AS GOLF OR F1) |
| LOSER NAME | LOSER PLAYER NAME / TEAM NAME |

RECORDING DEVICE, COMPUTER READABLE MEDIUM AND RECORDING METHOD

This application claims the benefit of Japanese Patent Application No. 2008-003681 filed on Jan. 10, 2008 in the Japanese Patent Office, the disclosure of which is herein incorporated in its entirety by reference.

FIELD OF THE INVENTION

The present invention relates to a recording device with a reservation function for recording, on a recording medium, contents of a televised program in accordance with contents of preset recording reservation, a computer readable medium making a computer function as the recording device, and a recording method of realizing recording based on such reservation function by use of the computer.

DESCRIPTION OF THE PRIOR ART

Over the recent years, a mainstream of a recording system of a video device has been in transit to a system for recording a program on a hard disk or a large-capacity optical disc such as a next generation DVD (Digital Versatile Disk) from a system for recording on a magnetic tape. As a result, the former system enables a plurality of programs to be reserved for recording at one time and sequentially recorded and accumulated without exchanging a recording medium (refer to Patent document 1).

By the way, in sports games held domestically and overseas, even if the game is of a popular sport and a popular player or a popular team participates in the game, an audience rating is estimated to rise, and therefore this type of game is in many cases broadcasted as a live TV program with a game time adjusted to a prime time (generally from about 7:00 pm to about 9:00 pm). As a matter of course, it is difficult to hold the game in nighttime in the case of outdoor athletic competitions other than field athletic competitions, and hence there is no alternative but to televise the program as a recorded program if televised in the prime time, even in the case of popular sports. Similarly, if the game is held overseas, the game time can not necessarily be set adjusting to the prime time in a country where the broadcasting is conducted, so that there is no alternative but to broadcast the program as the recorded program if televised in the prime time. On the other hand, unpopular sports games are broadcasted as recorded programs in a time zone (e.g., a midnight zone) there are a small number of viewers in many cases, since the audience grating can not be expected to rise.

Whichever broadcast system a program of a game is broadcasted with, the viewer, who is not available at the broadcasting time, sets recording reservation for the program in the recording device, and watches the game at the viewer's convenient time after finishing the broadcasting by reproducing the recorded broadcast program. Accordingly, when such a viewer actually reproduces the broadcast program, there is a high probability that the viewer happens to know a result of the game that will be released through a TV news program (including sports news program) or at a network site in many cases. Especially in the case of the recorded program, the result of the game is confirmed before a start of broadcasting the program, and hence there is a much higher probability that the viewer happens to know the game outcome.

Then, if a fan enthusiastically supporting the player or the team participating in the game happens to know that the player or the team lost in the game, he or she tends to be damped to view the recorded program. Further, even if knowing none of the game result, there are fans who do not want to watch the game in which his or her enthusiastically supporting player or team get lost. On the other hand, there are enthusiastic fans desiring to enjoy watching a play itself and to view the game in order to find out a cause of defeat even if the fans happen to know that his or her enthusiastically supporting player or team lost the game. However, even such enthusiastic fans do not think of recording the game with the highest image quality to store its recording data in many cases.

Japanese Patent Laid-Open Publication No. 2007-201573 and Japanese Patent Laid-Open Publication No. 2006-74459 disclose prior arts of a recording device.

According to the recording device in the prior art, however, if the viewer once reserves the recording, the reservation is by no means canceled unless any person intentionally operates the device thereafter. Accordingly, once the broadcast program of the game is reserved to be recorded, the broadcast program is recorded irrespective of the result of the game, even though a possibility that the viewer might reproduce the program decreases in case his or her enthusiastically supporting player or team loses in the game. Thus, a problem arises that the storage medium is occupied by the futile recorded data with no possibility of being reproduced. As described above, if the viewer is the enthusiastic fan who views even the game in which his or her enthusiastically supporting player or the team lost and if the viewer have a slightest intention of saving the program with the highest image quality, it still follows that the program recorded with the highest image quality futilely occupies the storage device.

SUMMARY OF THE INVENTION

It is an object of the present invention to solve the problem that the storage device is occupied by futile recording data in case the player or the team desired by the viewer to win lost the game.

According to a recording device of the present invention, a storage device is stored with, in addition to recording reservation data for specifying a broadcasting time zone and a broadcasting channel, preset data containing game specifying information for specifying a recording target game, competitor specifying information for specifying a player or a team participating in the game, and detection period specifying information for specifying a detection period. Then, when reaching the detection period specified by the detection period specifying information in the preset data, a communication device receives, from another device, result data containing result information of the game specified by the game specifying information in the preset data, and, if a loser specified by the received result data is coincident with the player or the team specified by the competitor specifying information in the preset data, the storage device is inhibited from being occupied by recording data based on the recording reservation data. As a result, in case the player or the team enthusiastically supported by an operator participates in the game of which broadcast program will be televised, the operator registers the preset data together with the recording reservation data of this program, which scheme can inhibit the storage device from being occupied by the recording data based on the recording reservation data even if the player or the team enthusiastically supported by the operator loses in the game.

Herein, the inhibition of the occupancy of the storage device with the recording data connotes a scheme of preventing all the recording data from remaining on the storage device and a scheme of downsizing the recording data. The latter scheme includes decreasing a bit rate of the recording data. To be specific, for example, if the broadcast program of the game has not been broadcasted yet, it is feasible to prevent all the recording data from remaining on the storage device by deleting the recording reservation data, and the prospective recording data will be downsized by rewriting an recording quality in the recording reservation data so that the bit rate may become a lower bit rate. Further, if the broadcast program of the game has been broadcasted, all the recording data can be prevented from remaining on the storage device by deleting the recording data from the storage device, and the recording data can be downsized by converting the recording data at the decreased bit rate. Still further, the broadcast program of the game is in the course of broadcasting, all the recording data can be prevented from remaining on the storage device by stopping the recording and deleting the recording data already recorded from the storage device, and the recording data can be downsized by decreasing the bit rate of recording data the in the course of recording.

Further, the game specifying information in the preset data may specifies the game by any kinds of techniques as long as it is suitable to a format of the data. For example, if the result data only specifies a sports genre and a winner or a loser, the game specifying information may also be that specifies the sports genre and the participating player or team (in this case, the participant specifying information serves as part of the game specifying information). Still further, if the result data also specifies game time, the game specifying information can be that specifying the game time. Yet further, if the result data specifies the item with a unique code allocated per game according to a predetermined code system, the game specifying information can be that specifying one code according to the code system.

Moreover, a first storage module through a third storage module may be configured as physically separate storage devices and may also be configured as three storage areas respectively having logical areas different from one another on a physically identical storage device.

According to the recording device having the configuration described above, in case the broadcast program of the game is reserved to be recorded, the viewer sets the data for specifying the game and the data for specifying the player or the team desired by the viewer to win in the game. Then, if the player or the team loses in the game, this fact can be recognized by acquiring the result data obtained via the computer network, and the storage device can be inhibited from being occupied by the recording data of the broadcast program.

BRIEF DESCRIPTION OF THE DRAWINGS

These and other objects and advantages of the present invention will become clear from the following description with reference to the accompanying drawings, wherein.

DETAILED DESCRIPTION OF THE PREFERRED EMBODIMENTS

An embodiment of a recording device will hereinafter be described.

The recording device described below is a multifunction TV system or a so-called TV personal computer each incorporating a TV broadcast receiving function, a recording function and an Internet connecting function. Note that a system architecture equivalent to the recording device according to the embodiment can be built up by connecting a TV tuner to a personal computer including a computer network connecting function and installed with various categories of software, and can be also built up as a system in which a display, a loudspeaker and other components are respectively housed in individual housings (which is a system constructed of a video recorder and a TV monitor). These differences are, however, nothing but differences simply in terms of a configuration of how commercial products are combined, and therefore the present invention is not limited to neither of these configurations.
(Configuration of Recording Device)

Figure 1:
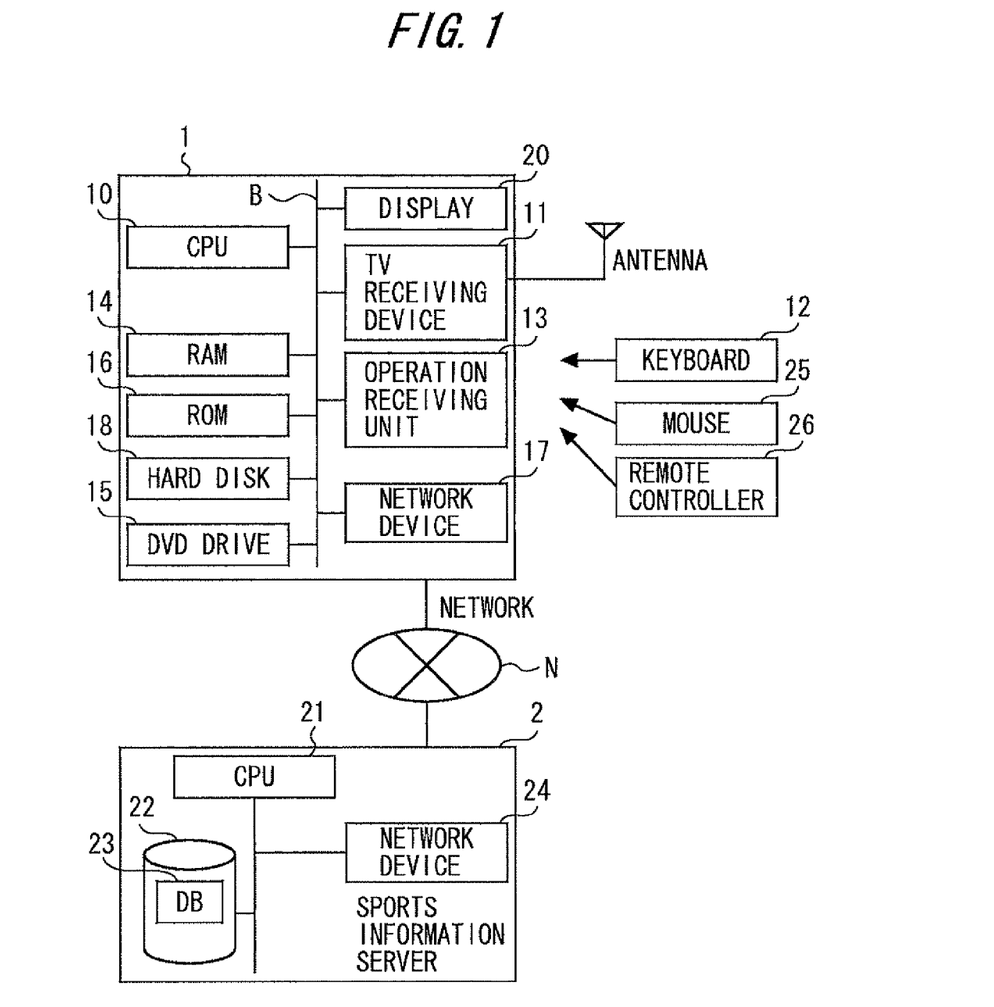
FIG. 1 is a block diagram showing outline configurations of a recording device and of a sports information server.

FIG. 1 is a block diagram showing a hardware architecture of a recording device 1 according to the embodiment, together with a server device (sports information server) 2 defined as another device enabled to communicate with the recording device 1 via a network N such as the Internet.

As illustrated in FIG. 1, the recording device 1 according to the embodiment is constructed of a CPU 10, and a TV receiving device 11, an operation receiving unit 13, a RAM 14, a DVD drive 15, a network device 17 and a display 20, which are respectively connected via a bus B to the CPU 10, with these components installed into the same housing. Further, the recording device 1 is provided with a keyboard 12, a mouse 25 and a remote controller 26 each having a different housing as an attachment.

The CPU 10 is a central processing unit that controls the whole of the recording device 1 by executing various categories of programs installed into a hard disk 18 or a ROM 16. The TV receiving device 11 is a detector connected to an antenna for ground waves or a satellite (or to a cable of a cable TV system), which separates video data and EPG (Electronic Program Guide) data carried on broadcasting signals received via the antenna or the cable, and inputs the separated data to the CPU 10. Note that The EPG data is the electronic program guide data organized for defining program information containing a broadcasting channel, a broadcasting time zone (start date/time and a program length) and contents of the broadcast (details of the program) for every program to be broadcasted at each channel.

The network device 17 is a communication device connected to the Internet N via a router, a terminal adaptor or a modem that are not illustrated, converting a data format for the communications via the Internet N and transmitting/receiving packets. Through the network device 17, the EPG data opened to the public on the Internet N can be acquired, and result data can be downloaded from the sports information server 2.

The RAM 14 is a temporary storage device on which an operation area used for the CPU 10 to execute a process for the control is developed.

The DVD drive 15 is a disk drive device that records video data separated by the TV receiving device 11 on a DVD (Digital Versatile Disk) medium and reads the video data from the DVD under the control of the CPU 10.

The display 20 is a display device that displays a moving picture based on the video data separated by the TV receiving device 11 or the video data read from the DVD medium by the DVD drive 15 under the control of the CPU 10, and displays a processing result of the CPU 10.

The operation receiving unit 13, which is an interface including, e.g., an infrared-ray receiving module or a Bluetooth (the trademark of Bluetooth SIG, Inc.) receiving module, receives operation signals respectively transmitted from the keyboard 12, the mouse 25 or the remote controller 26, then format-converts the signals and inputs the converted signals to the CPU 10.

The hard disk 18 is a storage device (storage medium) stored with various categories of programs and data. The various categories of programs preinstalled into the hard disk 18 and read and executed by the CPU 10 include an operating system (OS), a Browser program, a Mailer program, driver programs for operating the respective circuits 11-20, 25 and 26, etc which are normally incorporated into the personal computer having the Internet connecting function, a recording program needed for viewing, recording and reproducing the TV programs. The CPU 10 executing the recording program corresponds to a recording unit. Further, the recording program includes a losing game recording control program for automatically detecting that a player or a team specified by a viewer when the viewer reserves a broadcast program of a specified game lost in the game, and stops the reservation of recording of the broadcasted game, or deletes the recording data of the program or decreases a recording quality (bit rate of the recording). Further, the various categories of data stored in the hard disk 18 include recording data generated or read and written by the CPU 10 executing the recording program, recording reservation data (FIG. 2) for specifying the program to be recorded at a set channel in a set time zone, and preset data (FIG. 3) for defining a condition under which the reserved recording is stopped, the recording data is deleted or the recording quality (bit rate) is changed.

Figure 2:
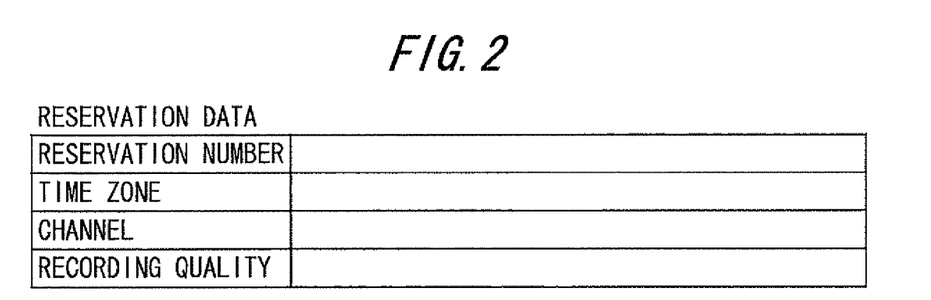
FIG. 2 is a table showing a data structure of reservation data.

FIG. 2 is a table showing a data structure of the recording reservation data described above. As shown in FIG. 2, the recording reservation data contains records each associated with each of the programs reserved to be recorded. Then, each record consists of fields such as a "reservation number ID" defined as a unique serial number, respective items of program information (a time zone, a channel) and a recording quality. The CPU 10 records, based on the recording program described above, the program specified by the recording reservation data as the already recorded data in the hard disk 18. An area stored with the recording reservation data in the hard disk 18 corresponds to a second storage module.

Figure 3:
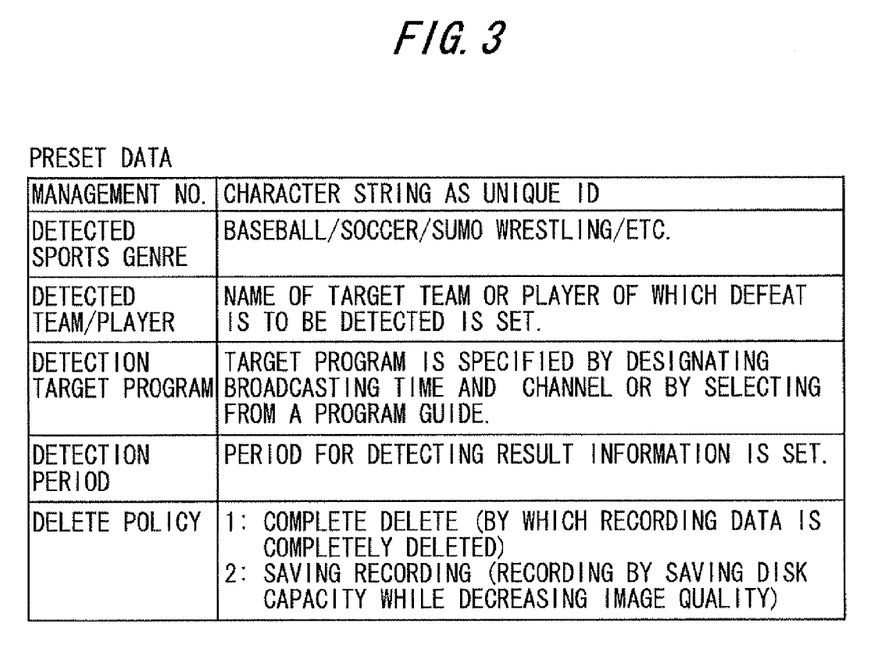
FIG. 3 is a table showing a data structure of preset data.

FIG. 3 is a table showing a data structure of the preset data described above. The preset data is data for defining information that specifies a game and viewer's enthusiastically supporting player of team with respect to the game for which reserved recording of a program should be stopped, recording data of a program should be deleted or the recording quality of a program should be decreased, if his or her enthusiastically supporting player or team loses in the game.

Therefore, the preset data consists, as shown in FIG. 3, of fields of "management No. (number)" containing a character string defined as an unique ID, "detected sports genre" for specifying a genre (category) of a target game, a "detected team/player" for specifying a name of the player or the team enthusiastically supported by the viewer, i.e., the name of the player or the team of which a defeat should be detected, a "detection target program" for specifying target broadcast program of which recording may be stopped, of which recording data may be deleted or of which recording quality decreased, a "detection period" for specifying a period during which a result information of a game (losing information) distributed from the sports information service server 2 after finishing the game, and a "delete policy" for specifying whether the reserved recording of the broadcast program of the game is stopped and the recording data is deleted (complete delete: 1), or the recording quality (bit rate) of the broadcast program is decreased "saving recording: 2". Note that a value of the "detection target program" may be information for specifying a broadcasting time zone or a channel of the reservation recording stop target program or a recording quality (bit rate) decreasing target program, and may also be a reservation number in the recording reservation data. These items of information can be also specified in such a way that the viewer selects the program from the EPG data.

An area stored with the preset data in the hard disk 18 corresponds to a first storage module. Further, an area stored with the recording data in the hard disk 18 corresponds to a third storage module.

an description of a process executed by the CPU 10 reading the losing game recording control program described above will be made later on in detail with reference to FIGS. 5 and 6.

(Configuration of Sports Information Service Server)

Referring back to FIG. 1, the sports information server 2 is a server device having a general type of configuration, and actualizes a site (sports information service site) for distributing result information of domestic and overseas games. To be specific, the sports information server 2 includes a CPU 21, a disk device 22 and a network device 24, wherein the CPU 21 stores successively-collected result information of the domestic/overseas games in a result database 23 within the disk device 22.

Figure 4:
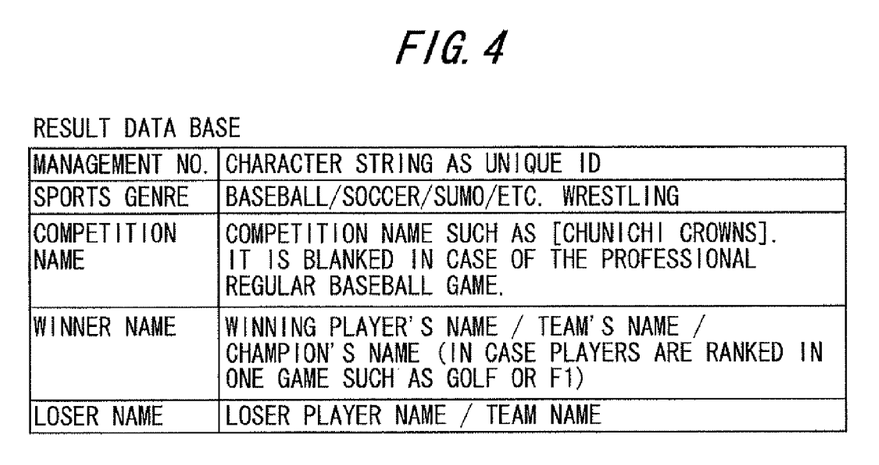
FIG. 4 is a table showing a data structure of a result database.

FIG. 4 is a table showing a data structure of this result database 23. As illustrated in FIG. 4, the result database 23 contains records each registered with a result of the game according to every individual game in a variety of sports games held domestically and overseas. Then, each record consists of fields of "management No. (number)" containing a character string defined as a unique ID, a "detected sports genre" for specifying a genre (category) of a target game, a "competition name" for specifying a game name and an eponym of a target game, a "winner name" recorded with a name of a player or a team that won in the game, a "loser name" for specifying a player or a team that lost in the game (the players or teams ranked second or under in a competition where many players or teams battle for the championship). Note that the competition name, which is an item (field) that can be arbitrarily set is registered in a case where a variety of league, series or tour games are held in parallel in one season.

Further, the sports information server 2 executing a World Wide Web server program and some CGI (Computer Graphic Interface) programs installed into the disk device 22 receives a message addressed to the sports information service site from any one of terminals via the network device 24, then searches the result database 23 with parameters (corresponding to the respective items of information such as the "detected sports genre" and the "detected team/player") in each record of the preset data contained in the message as search keys, subsequently extracts the record in which the value of the "detected sports genre" in the message is coincident with the value of "sports genre", and the value of the "detection team/player" in the message is coincident with the value of the "winner name" or the "loser name", and transmits the extracted records as the result data to a message sender terminal.

(Process Based on Recording Program)

Next, a process executed by the CPU 10 reading the losing game recording control program contained in the recording program in the thus-configured recording device 1 in cooperation with the sports information service server 2, will be explained based on flowcharts in FIGS. 5 through 8.

Figure 5:
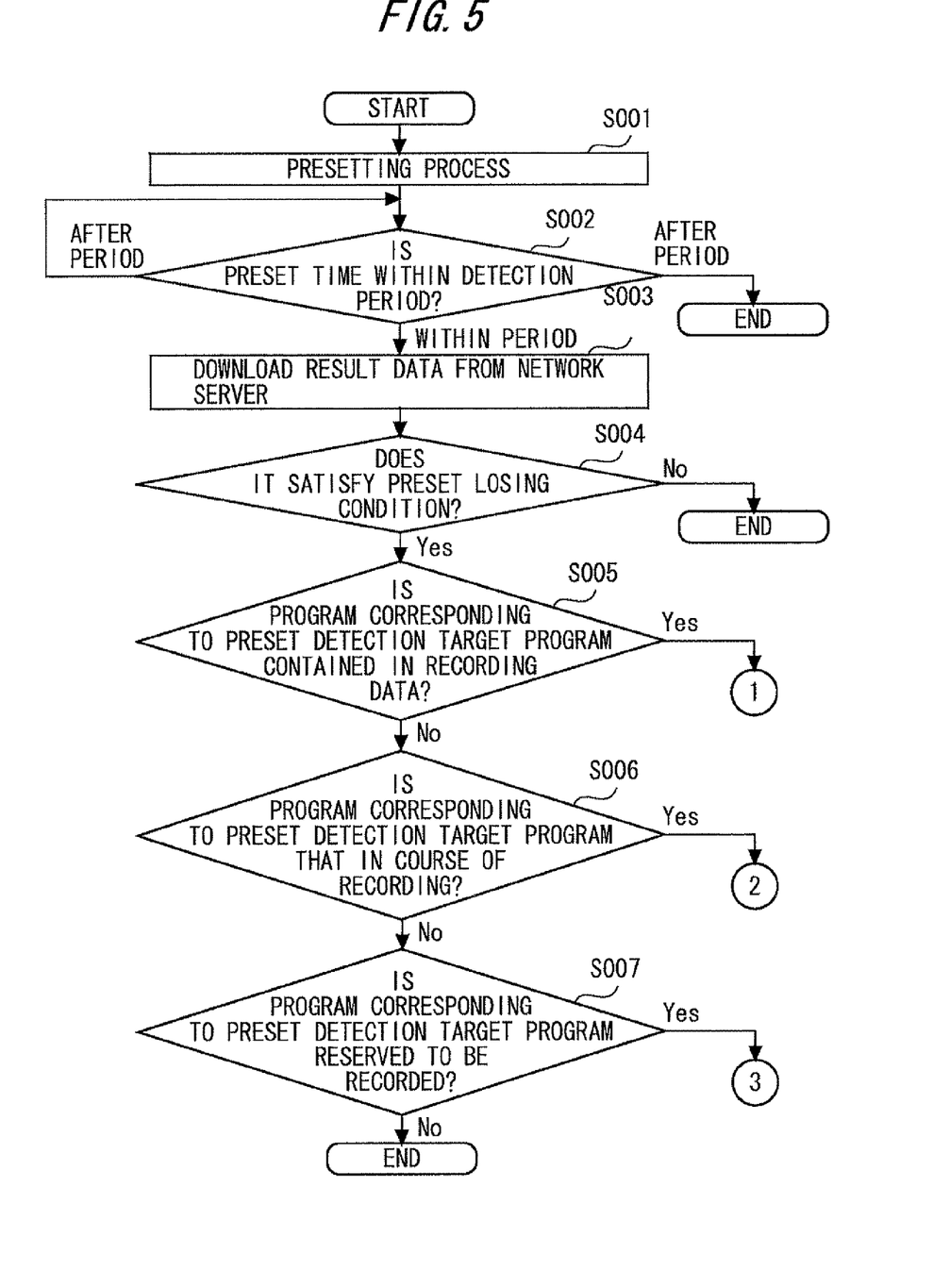
FIG. 5 is a flowchart showing a process according to a losing game recording control program.
Figure 6:
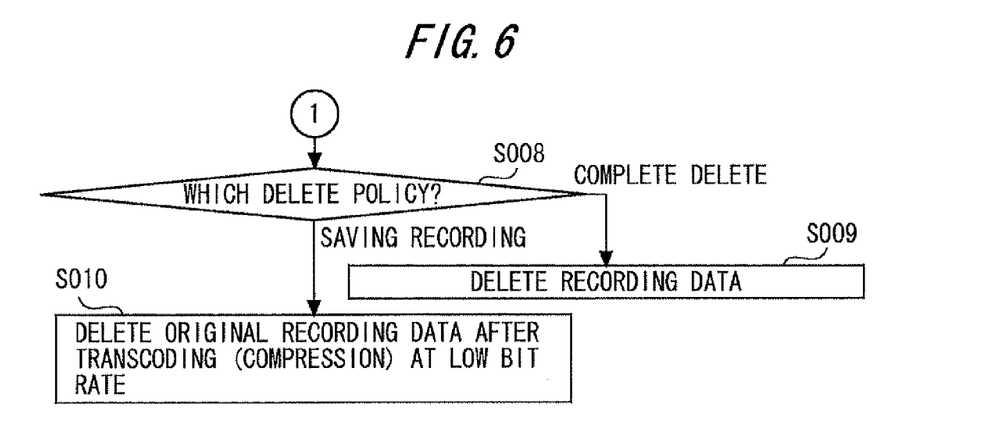
FIG. 6 is a flowchart showing the process according to the losing game recording control program.

A start of the flowchart in FIG. 5 is triggered by such an event that the operator as the viewer inputs a startup command of the recording program via the keyboard 12, the mouse 25 or the remote controller 2G. Then, in first step S001 after the start, the CPU 10 executes a process for registering the preset data. Namely, the CPU 10 displays an input screen provided with a plurality of text boxes and a registration button used for inputting the respective items of information to be contained in the preset data shown in FIG. 3 on the display 20, and, when the registration button is operated in a status where the operator inputs character strings to the individual text boxes by use of the keyboard 12, the mouse 25 or the remote controller 26, accepts the character strings as values of the respective items of information inputted to the text boxes. Then, the CPU 10 generates the preset data based on the accepted items of information and registers the preset data in the hard disk 18 (corresponding to preset data registration unit). Besides, the CPU 10 registers the recording reservation data on the basis of the information of the detection target program in the preset data. The registration of the recording reservation data may, however, be done according to a process of the normal recording reservation.

In next step S002, the CPU 10 checks whether the present date and time is before or within or after the detection period registered in the preset data in S001. Then, when determining that the present date and time is after the detection period, there is nothing but a setting mistake in the preset data, and hence the CPU 10 terminates this process. While on the other hand, when determining that the present date and time is before the detection period, the check in S002 is repeated. By contrast, when determining the present date and time is within the detection period, the CPU 10 advances the process to S003.

In S003, the CPU 10 transmits a result data request message, addressed to the sports information service site, in which the value of the "detected ports genre" and the value of the "detected team/player" in the preset data registered in S001 are set as parameters. The sports information server 2 receiving this request message, in the way described above, searches through the result database 23 by use of the value of the "detected ports genre" and the value of the "detected team/player" as the search keys. Note that, if the detected sport genre is such that the game is normally held once a day as in the case of the professional baseball, the target game can be specified based on the genre and the names of the players or the names of the teams participating in this game as far as the detection period is not so long. If a plurality of games take place a day as in the case of a doubleheader in the professional baseball, however, it is desirable to add information of game holding time to the result database 23, the preset data and the request message for specifying respective games. Then, the sports information server 2, if able to extract the data concerned from the result database 23, transmits a response of the extracted data as the result data to the recording device 1 which sent the request. The CPU 10 of the recording device 1 receives the result data that is replied or downloaded from the sports information server 2, which corresponds to a winning/losing data acquiring unit.

In next S004, the CPU 10 determines, based on the result data received from the sports information server 2, whether the player or the team specified by the value of the "detected team/player" in the preset data wins or loses. In case it is unable to recognize that the player or the team loses, where the name of the player or the team is coincident with the value of the "winner name" or the name of the player or the team is discrepant from the value of the "loser name", the CPU 10, because of there being no necessity for reserving the recording, terminates the process directly. By contrast, in case recognizing that the player or the team specified by the value of the "detected team/player" in the preset data loses, where the name of the player or the team is coincident with the value of the "winner name", the CPU 10 advances the process to S005.

Incidentally, the scheme in the process in S003 and S004 is that the CPU 10 of the recording device 1 transmits, to the sports information service site, the result data request message including as parameters the values of the "detected sports genre" and the "detected team/player" in the preset data, the sports information server 2 receiving this request message extracts the relevant result data from the result database 23 and sends the data as the response to the CPU 10, and the CPU 10 of the recording device 1 determines based on the result data given as the response whether the target player or team loses or not, however, it can adopt another available scheme that the CPU 10 of the recording device 1 transmits the request messages of all the result data for the games held on the very day to the sports information service site in S003, then receives the result data given as the response to the request from the sports information service server 2, extracts the result data coincident with the values of the "detected sports genre" and the "detected team/player" in the preset data from the received result data, and determines, based on the extracted result data, whether the target player or team loses or not.

In S005, the CPU 10 checks whether or not the program corresponding to the value of the "detection target program" in the preset data is already recorded and therefore its recording data is contained in the hard disk 18. For example, if the program is a live broadcast program, it is determined in this step that the recording data is contained in it, and the process proceeds to S008.

In S008, the CPU 10 checks whether the value of the "delete policy" in the preset data is the "complete delete (1)" or the "saving recording (2)", then deletes the recording data in S009 if being the complete delete (1), and terminates the process based on the losing game recording control program. By contrast, if being the saving recording (2), in Solo, the CPU 10 transcodes (transcoding compression) the recording data at a low bit rate, and, after deleting the original recording data, terminates the process based on the losing game recording control program.

Whereas if it is determined in S005 that none of the recording data is contained, the CPU 10 advances the process to S006, and checks whether or not the program corresponding to the value of the "detection target program" in the preset data is in the course of being recorded by the recording program. For example, in the great majority of broadcast programs of golf competitions broadcasted in our country at the present, they record the game picture of each party in the way of being finely segmented in frames, edit the frames and thereafter broadcast the edited video, and consequently there is a possibility that the actual game will have already been ended during the broadcasting time of the broadcast program. Further, a picture of an unexpected accident is to be cut off, so that there is a case of televising a program referred to as a live broadcast in a way that shifts the broadcasting time by a fixed period of time from the recording of the actual game. The step concerned is a process adapted to such a broadcasting mode.

Figure 7:
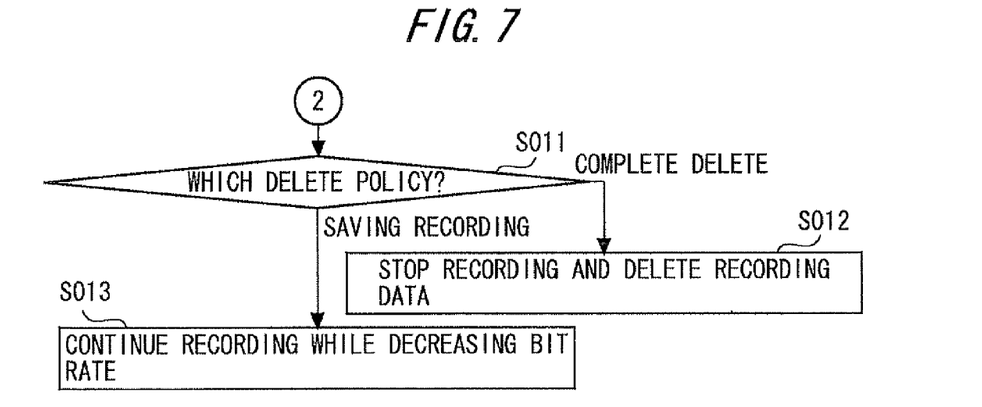
FIG. 7 is a flowchart showing the process according to the losing game recording control program.

Then, if determining the program is in the course of being recorded at the present, the CPU 10 advances the process to S011.

In S011, the CPU 10 checks whether or not the value of the "delete policy" in the preset data specifies the complete delete (1) or the saving recording (2), then stops recording by interrupting the recording program in S012 if being the complete delete (1), and terminates the process based on the losing game recording control program after deleting the recording data accumulated so far. By contrast, if being the saving recording (2), in S013, the CPU 10 transcodes (transcoding compression) the recording data at a low bit rate, and, after deleting the original recording data, terminates the process based on the losing game recording control program.

Whereas if it is determined that the program is not in the course of being recorded, the CPU 10 advances the process to S007, and checks whether the program corresponding to the value of the "detection target program" in the preset data is that reserved to be recorded by any recording reservation data. Namely, in the case of the broadcast program under recording, the program is edited and televised after the end of the game, and hence a result of the game might be detected before the TV broadcasting. The step concerned is a process adapted to such a situation. Then, when determining that the program is recording-reserved, the CPU 10 advances the process to S014.

Figure 8:
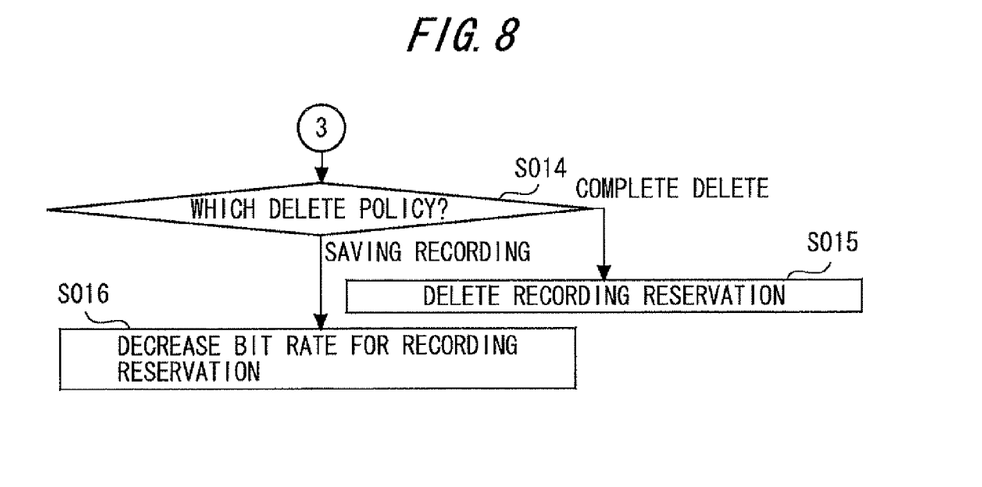
FIG. 8 is a flowchart showing the process according to the losing game recording control program.

In S014, the CPU 10 checks whether the value of the "delete policy" in the preset data specifies the complete delete (1) or the saving recording (2), and terminates the process based on the losing game recording control program after deleting the recording data of the program in S015 if being the complete delete (1). By contrast, if being the saving recording (2), the CPU 10, after resetting the value of the "recording quality" in the recording reservation data of the program by decreasing the bit rate, in S016, finishes the process based on the losing game recording control program.

Whereas if it is determined that the program is not reserved to be recorded, the CPU 10 deems that the setting mistake occurs in the preset data and terminates the process based on the losing game recording control program.

The CPU 10 executing the processes in S005 through S016 explained above corresponds to the inhibiting unit inhibiting the hard disk 18 from being occupied by the recording data based on the recording reservation data.

(Operation in Embodiment)

According to the embodiment having the configuration described above, in such a case that the game in which the player or the team enthusiastically supported by an operator as a viewer participates is held and its broadcast program is scheduled to be televised, the operator starts up the recording program by operating the recording device 1 and reserves recording of the broadcast program. The recording reservation data is thereby generated in the hard disk 18. Simultaneously with this operation, the operator starts up the losing game recording control program by operating the recording device 1, and sets the preset data (S001). On this occasion, the fixed period of time ranging from scheduled terminate time of the game is set in the "detection period" of the preset data, the name of the player or the team enthusiastically supported by the viewer is set in the "detected team/player", the category of the sports to which the game belongs is set in the "detected sports genre", the "complete delete (1)" is set in the "delete policy" if the viewer does not view the broadcast program when the player or the team enthusiastically supported by the viewer lost in the game, and the "saving recording (2)" is set in the "delete policy" if there is the possibility of viewing the broadcast program even when the player or the team enthusiastically supported by the viewer lost in the game, respectively. Note that if the process in S001 synchronizes with the registration of the recording reservation data, the recording reservation data and the preset data are registered at once.

When entering the "detection period" after the presetting process has been executed as described above, the CPU 10 of the recording device 1 downloads the result data from the sports information server 2 (S003). The result data contains metadata for specifying the name of the loser (a player name or a team name) of the game, and hence the CPU 10 of the recording device 1 can distinctly recognizes the result of the game. Then, when recognizing that the team or the player specified by the value of the "detected team/player" contained in the preset data lost in the game (S004; YES), depending on whether the broadcast program is before being televised or in the course of being televised or after being televised at that point of time, the scheme is to prevent the recording data from being left in the hard disk 18 if the complete delete (1) is set in the "delete policy" in the preset data (S009, S012, S015) and to leave the recording data downsized at the decreased bit rate if the saving recording (2) is set in the "delete policy" (S010, S013, S016).

As a result, the resources of the hard disk 18 can be inhibited from being futilely occupied by the recording data of the broadcast program of the game about which the viewer gets disappointed with the defeat of his or her enthusiastically supporting player of team and has the appetite neither for viewing nor for saving with a high quality.

We claim:

1. A recording device recording, on a storage medium, a television program televised at a broadcasting channel in a broadcasting time zone on the basis of recording reservation data that specifies the broadcasting time zone and the broadcasting channel, said recording device comprising:

a first storage module stored with preset data containing game specifying information for specifying a recording target game, competitor specifying information for specifying a player or a team participating in the game, and detection period specifying information for specifying a detection period;

a second storage module stored with the recording reservation data;

a communication device connected to a computer network and performing communications with another device on the computer network;

a recording unit recording the TV program according to the recording reservation data and generating recording data;

a third storage module stored with the recording data generated by said recording unit;

a result data acquiring unit getting result data received from said another device, which contains result information of the game specified by the game specifying information in the preset data by controlling said communication device during the detection period specified by the detection period specifying information in the preset data; and an inhibiting unit inhibiting, if a loser specified by the received result data is coincident with the player or the team specified by the competitor specifying information in the preset data, said third storage module from being occupied by the recording data to be recorded based on the recording reservation data.

2. A non-transitory computer readable medium storing a program read and executed by a computer including a TV tuner, a storage device and a communication device connected to a computer network and performing communications with another device on the computer network, recording a TV program according to recording reservation data registered in said storage device and storing said storage device with its recording data, to make the computer function as:

a preset data registration unit storing said storage device with preset data containing game specifying information for specifying a recording target game, competitor specifying information for specifying a player or a team participating in the game, and detection period specifying information for specifying a detection period;

a result data acquiring unit getting the result data received from said another device, which contains result information of the game specified by the game specifying information in the preset data by controlling said communication device during the detection period specified by the detection period specifying information in the preset data; and     an inhibiting unit inhibiting, if a loser specified by the result data is coincident with the player or the team specified by the competitor specifying information in the preset data, said storage device from being occupied by the recording data to be recorded based on the recording reservation data.

3. A recording method of recording a TV program by a computer including a TV tuner, a storage device and a communication device connected to a computer network and performing communications with another device on the computer network, recording a TV program according to recording reservation data that specifies a broadcasting time zone and a broadcasting channel registered in said storage device and storing said storage device with its recording data, said computer executing:

storing said storage device with the recording reservation data;

storing said storage device with preset data containing game specifying information for specifying a recording target game, competitor specifying information for specifying a player or a team participating in the game, and detection period specifying information for specifying a detection period;

getting result data received from said another device, which contains result information of the game specified by the game specifying information in the preset data by controlling said communication device during the detection period specified by the detection period specifying information in the in-advance setting data; and     inhibiting, if a loser specified by the received result data is coincident with the player or the team specified by the competitor specifying information in the preset data, said storage device from being occupied by the recording data to be recorded based on the recording reservation data.

\* \* \* \* \*